United States Patent
Wamsley

(10) Patent No.: US 9,942,948 B2
(45) Date of Patent: Apr. 10, 2018

(54) METHOD OF CONTROLLING A HEATED PORTION OF A WINDSHIELD

(71) Applicant: FORD GLOBAL TECHNOLOGIES, LLC, Dearborn, MI (US)

(72) Inventor: William Joseph Wamsley, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 479 days.

(21) Appl. No.: 14/826,826

(22) Filed: Aug. 14, 2015

(65) Prior Publication Data

US 2017/0048932 A1     Feb. 16, 2017

(51) Int. Cl.
| | |
|---|---|
| *H05B 1/02* | (2006.01) |
| *H05B 3/06* | (2006.01) |
| *H05B 3/86* | (2006.01) |
| *B60S 1/04* | (2006.01) |
| *H05B 3/84* | (2006.01) |

(52) U.S. Cl.
CPC ............... *H05B 3/86* (2013.01); *B60S 1/048* (2013.01); *H05B 1/0236* (2013.01); *H05B 3/84* (2013.01); *H05B 2203/031* (2013.01); *H05B 2214/02* (2013.01)

(58) Field of Classification Search
None
See application file for complete search history.

(56) References Cited

U.S. PATENT DOCUMENTS

| | | | | |
|---|---|---|---|---|
| 5,010,289 | A | * | 4/1991 | Takada ................... B60S 1/026 15/250.001 |
| 5,305,011 | A | * | 4/1994 | Furuya ................... B60K 35/00 340/980 |
| 5,386,098 | A | * | 1/1995 | Knudsen ........... B32B 17/10036 219/203 |
| 5,496,989 | A | * | 3/1996 | Bradford ................ B60S 1/026 219/482 |
| 5,555,502 | A | * | 9/1996 | Opel .................. B60H 1/00985 701/36 |

(Continued)

FOREIGN PATENT DOCUMENTS

| CN | 1984513 A | 6/2007 |
|---|---|---|
| CN | 103158673 A | 6/2013 |

(Continued)

OTHER PUBLICATIONS

English Translation of DE20303451U1.
English Translation of CN103158673A.
English Translation of CN1984513A.

*Primary Examiner* — Joseph M Pelham
(74) *Attorney, Agent, or Firm* — Vichit Chea; King & Schickli, PLLC

(57) ABSTRACT

A method of preventing a windshield wiper from freezing to a windshield of a vehicle is provided. The method broadly includes the steps of: (a) monitoring a state of the windshield wiper; (b) initiating a timer when the state of the windshield wiper changes from an off state to an on state; sensing an ambient temperature of the vehicle a first period of time after initiation of the timer if the windshield wiper remains in the on state; and (c) warming a portion of the windshield where the windshield wiper resides in the off state if the sensed ambient temperature of the vehicle is near or below zero degrees Celsius.

20 Claims, 3 Drawing Sheets

(56) References Cited

U.S. PATENT DOCUMENTS

| | | | | |
|---|---|---|---|---|
| 5,694,011 A * | 12/1997 | Corey | B60S 1/08 | 318/280 |
| 5,791,407 A | 8/1998 | Hammons | | |
| 5,873,256 A * | 2/1999 | Denniston | B60H 1/00414 | 62/244 |
| 6,037,573 A | 3/2000 | Arsenault et al. | | |
| 6,150,639 A * | 11/2000 | Ruan | B60S 1/0818 | 219/494 |
| 6,369,358 B1 * | 4/2002 | Blessing | B60S 1/048 | 219/203 |
| 7,309,970 B2 | 12/2007 | Gao | | |
| 9,758,129 B2 * | 9/2017 | Crombez | B60S 1/0818 | |
| 2003/0169522 A1 * | 9/2003 | Schofield | B60R 1/04 | 359/876 |
| 2005/0273218 A1 * | 12/2005 | Breed | B60C 11/24 | 701/2 |
| 2006/0086715 A1 * | 4/2006 | Briggs | B32B 17/10174 | 219/488 |
| 2007/0057781 A1 * | 3/2007 | Breed | B60K 35/00 | 340/457.1 |
| 2007/0089258 A1 * | 4/2007 | Wick | B60S 1/3805 | 15/250.06 |
| 2007/0194735 A1 * | 8/2007 | Gao | B60H 1/00642 | 318/443 |
| 2008/0060384 A1 | 3/2008 | Mackey et al. | | |
| 2009/0109011 A1 * | 4/2009 | Lee Kuo | B60C 23/0401 | 340/441 |
| 2012/0099170 A1 * | 4/2012 | Shikii | G02B 27/01 | 359/3 |
| 2012/0234816 A1 * | 9/2012 | Petrenko | H05B 3/84 | 219/203 |
| 2016/0363766 A1 * | 12/2016 | Schmitz | B60H 1/00785 | |
| 2016/0375828 A1 * | 12/2016 | Yun | B60S 1/54 | 701/48 |
| 2017/0113654 A1 * | 4/2017 | Crombez | B60S 1/0818 | |
| 2018/0001872 A1 * | 1/2018 | Dudar | H02P 1/18 | |
| 2018/0014362 A1 * | 1/2018 | Bulgajewski | H05B 3/86 | |

FOREIGN PATENT DOCUMENTS

| | | | | |
|---|---|---|---|---|
| DE | 19709166 A1 * | 9/1998 | | B60S 1/026 |
| DE | 20303451 U1 | 7/2003 | | |
| EP | 1234736 B1 | 4/2006 | | |

\* cited by examiner

METHOD OF CONTROLLING A HEATED PORTION OF A WINDSHIELD

TECHNICAL FIELD

This document relates generally to windshields, and more specifically to a method of preventing windshield wipers from freezing to a windshield of a vehicle.

BACKGROUND

It is well known that windshield wipers can become stuck, or frozen, to a vehicle windshield in certain inclement weather. Vehicle operators who park their vehicles outdoors at night or during the day often find their vehicle covered in snow and/or ice. In these situations, clearing the windshield of the snow and/or ice is not always sufficient to unstick the windshield wipers from the windshield. Typically, the vehicle operator will have to physically move the windshield wiper to overcome the retentive force created by the snow and/or ice. In addition to being a nuisance for the vehicle operator, physically moving the windshield wiper can also result in damage to the windshield wipers or wiper blades.

In other scenarios, the vehicle owner may start the vehicle allowing it time to warm up and at least partially clear the windshield. This may be done utilizing a remote vehicle start function or manually. In such scenarios, the vehicle operator typically turns on a rear window heater and a defroster to warm the front windshield. Typically, however, the vent through which the warm air blows onto the front windshield in the defrost mode contacts the window above a zone of the windshield where the windshield wipers typically reside when not in use. In other words, the defroster only warms a portion of the windshield excluding a windshield wiper park zone. Again, the windshield may be substantially cleared of snow and/or ice by the defroster but the windshield wiper may remain frozen to the windshield within the windshield wiper park zone, Although mechanisms have been developed to warm the windshield wiper park zone, these mechanisms are limited primarily to a pre-warming sequence or a sequence which remains on throughout the entire time the vehicle is running. In other words, warming of the windshield wiper park zone whether for a pre-warming period or the entire time the vehicle is running is only initiated by the vehicle owner starting the vehicle, whether manually or remotely, to allow the vehicle time to warm up and at least partially clear the windshield.

While these mechanisms have proven useful in these scenarios to warm the windshield wiper park zone sufficient to release the windshield wipers from the windshield they each suffer from certain drawbacks. The pre-warming sequence, for example, does not account for scenarios where the windshield wiper park zone refreezes after the pre-warming period elapses and the windshield wipers become stuck during operation of the vehicle. In such a scenario, the vehicle operator has to cease operating the vehicle to address the issue manually, continue operating the vehicle without windshield wiper function, restart the car in order to re-engage the pre-warming sequence, or engage a human machine interface (HMI) to initiate a new warming sequence if the particular vehicle has an HMI. The warming sequence which occurs throughout the entire period of time the vehicle is operating likewise has drawbacks. Primarily, the continuous warming sequence consumes a significant amount of current throughout the sequence. Some, or even most, of this current consumption could be occurring during periods where warming is no longer required due to ambient temperature increases and/or a lack of need for windshield wiper function.

Accordingly, a need exists for a way to prevent a windshield wiper from freezing to a windshield park zone that is not limited to a pre-warming sequence, a continuous sequence, or manually engaged sequences utilizing HMI. Ideally, the warming sequence would be initiated when the ambient temperature is near or below freezing and when the vehicle operator indicates a windshield wiper function is needed. In order to avoid starting and stopping of the sequence for intermittent use of the windshield wiper function, the warming sequence could be initiated after the windshield wiper function had been engaged for a period of time. The warming function could also extend until the windshield wiper function is disengaged or until the ambient temperature is sufficient to avoid freezing.

Even more, the warming sequence could be combined with the pre-warming sequence to ensure proper windshield wiper function at start up and throughout operation of the vehicle while limiting current consumption and eliminating the need for the vehicle operator to engage HMI. The warming sequence could also be combined with other vehicle functions that might indicate a need for warming the windshield wiper park zone.

SUMMARY OF THE INVENTION

In accordance with the purposes and benefits described herein, a method is provided of preventing a windshield wiper from freezing to a windshield of a vehicle. The method may be broadly described as comprising the steps of: monitoring a state of the windshield wiper; initiating a timer when the state of the windshield wiper changes from an off state to an on state; sensing an ambient temperature of the vehicle a first period of time after initiation of the timer if the windshield wiper remains in the on state; and warming a portion of the windshield where the windshield wiper resides in the off state if the sensed ambient temperature of the vehicle is near or below zero degrees Celsius.

In one possible embodiment, the warming step is performed only if the windshield wiper remains in the on state throughout the first period of time.

In another possible embodiment, the first period of time is equal to or greater than ten seconds.

In yet another possible embodiment, the warming step is performed for a second period of time. In still another, the warming step is performed until the state of the windshield wiper changes from the on state to the off state.

In one other possible embodiment, the step of sensing an ambient temperature of the vehicle a first period of time after initiation of the timer is continuous, and the warming step is performed until the state of the windshield wiper changes from the on state to the off state or the sensed ambient temperature of the vehicle is no longer near or below zero.

In another possible embodiment, the method further includes the steps of monitoring a state of an engine of the vehicle, sensing an ambient temperature of the vehicle when the state of the engine changes from an off state to an on state, and warming a portion of the windshield where the windshield wiper resides in the off state for a third period of time if the sensed ambient temperature of the vehicle related to the state of the engine is near or below zero degrees Celsius.

In still another possible embodiment, the warming step relating to the state of the windshield wiper is performed only if the windshield wiper remains in the on state throughout the first period of time. In yet another possible embodiment, the warming step relating to the state of the windshield wiper is performed until the state of the windshield wiper changes from the on state to the off state.

Another possible method of preventing a windshield wiper from freezing to a windshield of a vehicle may be broadly described as comprising the steps of: continuously sensing an ambient temperature of the vehicle; initiating a timer when a state of the windshield wiper changes from an off state to an on state; and warming a portion of the windshield where the windshield wiper resides in the off state if the sensed ambient temperature of the vehicle is near or below zero degrees Celsius a predetermined period of time after initiation of the timer.

In another possible embodiment, the warming step is performed only if the windshield wiper remains in the on state throughout the predetermined period of time. In yet another, the predetermined period of time is equal to or greater than ten seconds.

In still another possible embodiment, the warming step is performed for a second predetermined period of time.

In one other possible embodiment, the warming step is performed until the state of the windshield wiper changes from the on state to the off state or the sensed ambient temperature of the vehicle is no longer near or below zero.

In another possible embodiment, the method further includes the steps of monitoring a state of an engine of the vehicle, and initiating the warming step when the state of the engine changes from an off state to an on state if the sensed ambient temperature of the vehicle is near or below zero degrees Celsius.

In yet still another possible embodiment, the method further includes the steps of monitoring a state of a defrost switch of the vehicle; and initiating the warming step when the state of the defrost switch changes from an off state to an on state if the sensed ambient temperature of the vehicle is near or below zero degrees Celsius.

In another possible embodiment, a circuit for preventing a windshield wiper from freezing to a windshield of a vehicle may be broadly described as comprising a temperature sensor for sensing an ambient temperature of a vehicle, a windshield wiper switch for controlling a state of the windshield wiper, a climate control module for receiving an output of the temperature sensor indicative of the ambient temperature of the vehicle, monitoring the state of the windshield wiper, and initiating a timer when the state of the windshield wiper changes from an off state to an on state, a heat source thermally coupled to the windshield for warming a portion of the windshield where the windshield wiper resides in an off state, and a switch, responsive to the climate control module, for switching power to the heat source if the sensed ambient temperature of the vehicle is near or below zero degrees Celsius and the windshield wiper is in the on state for a predetermined period of time.

In still another possible embodiment, the predetermined period of time is equal to or greater than ten seconds.

In yet another possible embodiment, the switch, responsive to the climate control module, removes power to the heat source if the the state of the windshield wiper changes from the on state to the off state or the sensed ambient temperature of the vehicle is no longer near or below zero.

In other possible embodiments, the circuits for preventing a windshield wiper from freezing to a windshield described above are incorporated into a vehicle.

In the following description, there are shown and described several embodiments of a method of preventing a windshield wiper from freezing to a windshield of a vehicle and a related circuit. As it should be realized, the methods and systems are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle, circuits, and method and together with the description serve to explain certain principles thereof. In the drawing figures.

Reference will now be made in detail to the present preferred embodiments of the method of preventing a windshield wiper from freezing to a windshield of a vehicle and related circuits, examples of which are illustrated in the accompanying drawing figures, wherein like numerals are used to represent like elements.

DETAILED DESCRIPTION

Figure 1:
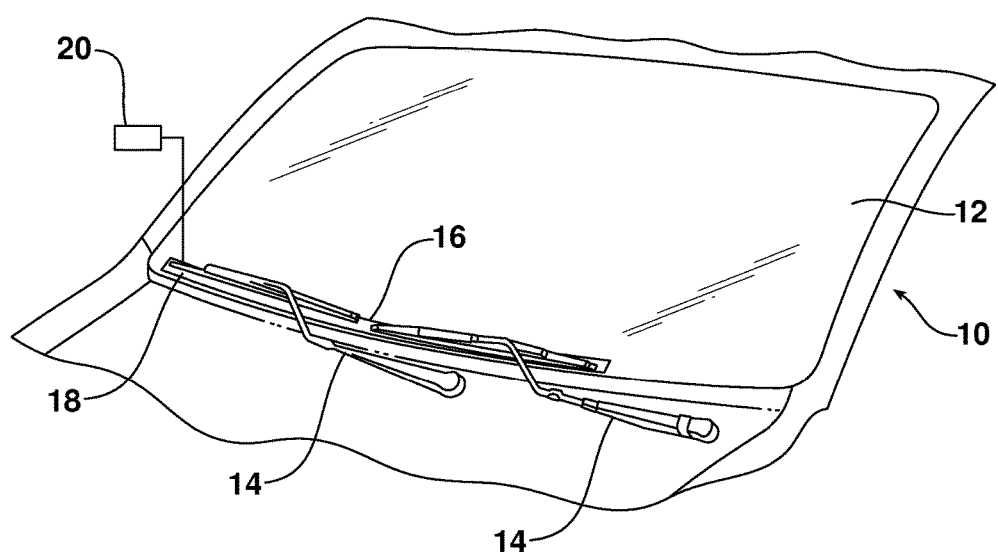
FIG. 1 is a is partial perspective view of a vehicle showing a windshield and a pair of windshield wipers positioned in a non-use or parked position.

Reference is now made to FIG. 1 which illustrates a partial vehicle 10 and a windshield 12. A pair of windshield wipers 14 are shown in a non-use or parked position. In this position, the windshield wipers 14 are in an "OFF" state. That is to say, power is not applied to the windshield wipers whether in a slow, intermittent, fast or any other mode of operation. Although a pair of windshield wipers are used in the described embodiment, other embodiments could use one or more than two windshield wipers. Also shown is a windshield wiper park zone 16 of the windshield 12 that is heated in accordance with the invention to prevent the windshield wipers 14 from freezing or otherwise sticking to the windshield. The windshield wiper park zone 16 is an area where the windshield wipers 14 generally reside in the "OFF" state of the windshield wipers. A heat source 18, electrically connected to a control circuit 20, which is described in detail below, is thermally coupled to the windshield 12 or, more specifically, to the windshield wiper park zone 16 of the windshield.

The heat source 18 for warming the windshield wiper park zone 16 can take any form known in the art such as embedding a wire within a windshield. In another example, a heating grid extending within the windshield wiper park zone and side bus bars may be printed on a polyethylene terephthalate (PET) film using a nano silver for one layer with copper applied with an electroplating process to build up the electrical conductance of the heating grid. The PET film may be sandwiched between first and second layers of polyvinyl butyral (PVB) layers and the PVB layers may each be laminated to inner and outer glass panels which together form a composite windshield.

Figure 2:
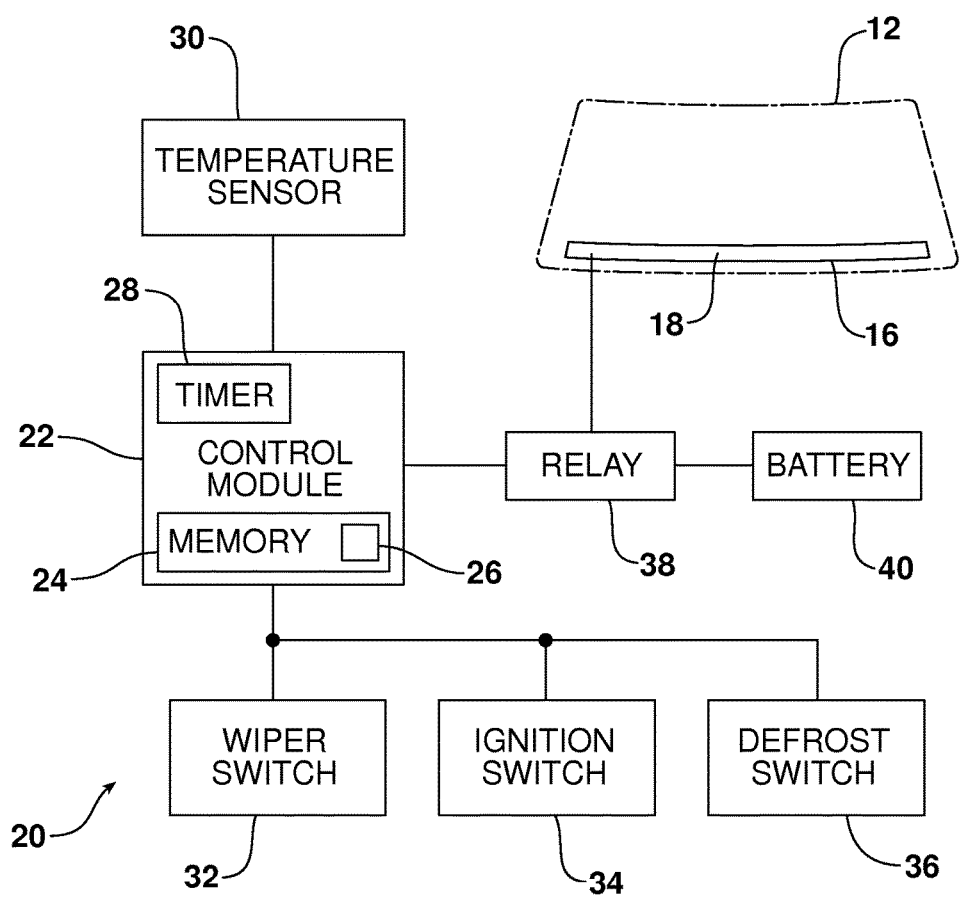
FIG. 2 is a is a block diagram of an exemplary circuit including a climate control module for preventing a windshield wiper from freezing to a windshield of a vehicle.

FIG. 2 is a schematic diagram of an exemplary control circuit 20 including a climate control module 22 for preventing the windshield wipers 14 from freezing to the windshield wiper park zone 16 of the windshield of the vehicle 10. As shown, the control module 20 includes a memory 24 wherein a windshield warmer control program 26 is stored, and an internal timer 28. The timer 28 is utilized to determine elapsed times, among other tasks, as will be described in more detail below. Such elapsed times, predetermined periods of time, and/or temperature set points (e.g., two degrees Celsius) described herein are configurable and may be changed during the manufacturing process, or in possible alternate embodiments by the vehicle owner.

In the exemplary control circuit 20, the control module 22 continuously monitors an output ($T_A$) of a temperature sensor 30 indicative of an ambient temperature of the vehicle 10. The control module 22 further monitors "ON" and "OFF" states of a windshield wiper switch 32, an ignition switch 34, and a defrost switch 36. In other embodiments, the temperature sensor output ($T_A$) could be obtained by the control module 22 in response to certain events rather than continuously. For example, the temperature sensor output ($T_A$) could be obtained in response to a state of the windshield wiper switch 32 changing from the "OFF" state to the "ON" state, a state of the defrost or ignition switches changing from an "OFF" to an "ON" state, or an elapsed period of time following one of such events. In other words, the ambient temperature could be obtained from the temperature sensor 30 at any time throughout the process on an as needed basis or continuously.

In operation, the heat source 18 remains in an "OFF" state until a state of the windshield wipers 14 changes from the "OFF" state to the "ON" state. At this point, the timer 28 in the control module 22 is utilized to determine when a predetermined period of time has elapsed. In the described embodiment, the period of time is ten seconds. Once the predetermined period of time has elapsed, the control module 22 determines whether the sensed temperature ($T_A$) is near or below zero degrees Celsius.

In the described embodiment, two degrees Celsius is considered near zero degrees Celsius. However, other temperatures could be utilized. In addition, the control module 22 may also filter the sensed temperature through algorithms designed to correct possible inaccuracies in the sensed ambient temperature. The sensed ambient temperature could include inaccuracies due to positioning the temperature sensor 30 within an engine compartment of the vehicle 10 or due to the speed the vehicle is travelling creating a wind chill at the windshield wiper park zone. Accordingly, if the sensed temperature ($T_A$) is above zero degrees Celsius, then the control module 22 resets the timer and again monitors the state of the windshield wipers 14. In other words, the heat source 18 is not turned to an "ON" state because at these temperatures the windshield wipers 14 should not freeze to the windshield 12.

If the sensed temperature ($T_A$) is near or below zero degrees Celsius, the control module 22 signals the relay 38 to switch power from a battery 40 of the vehicle 10 to the heat source 18 thermally coupled to the windshield 12 for warming the windshield wiper park zone 16. In other words, the heat source 18 is turned to an "ON" state by the control module 22 via relay 38. The heat source 18 remains in the "ON" state until the state of the windshield wipers 14 changes from the "ON" state to the "OFF" state. Once the windshield wiper state changes to the "OFF" state, the control module 22 signals the relay 38 to remove power supplied by the battery 40 of the vehicle 10 from the heat source 18, resets the timer, and again monitors the state of the windshield wipers 14.

Figure 3:
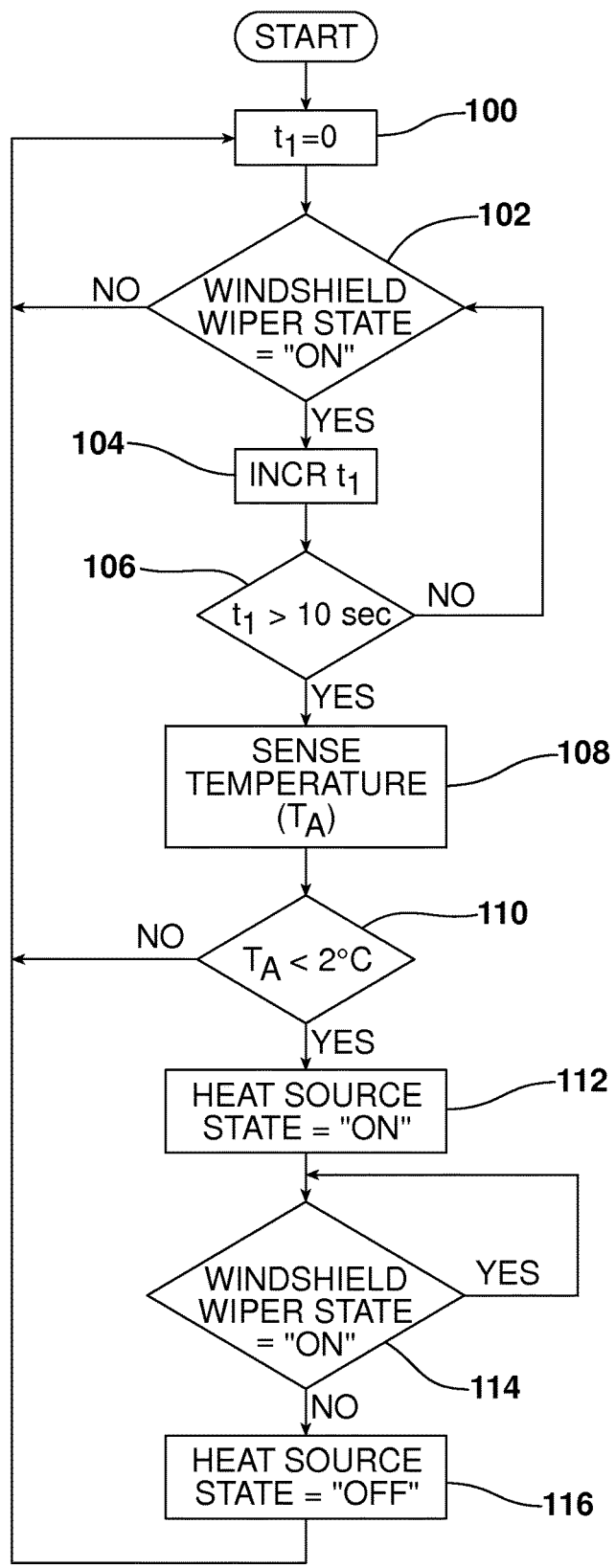
FIG. 3 is a flow chart schematic for preventing a windshield wiper from freezing to a windshield of a vehicle.

The steps utilized in the described embodiment will now be described with reference to FIG. 3. FIG. 3 is a flowchart of operational control of the heat source 18 of the vehicle 10 according to the described embodiment. The processing sequence related to operational control of the heat source 18 of the vehicle 10 according to the described embodiment is executed by a processor (not shown) of control module 22 as a program 26 stored in memory 24.

Upon initiation of the sequence, a timer 28 within the control module 22 is initiated setting time $t_1$ to "0" at Step 100, and an "ON" or "OFF" state of the windshield wipers 14 is determined at Step 102. If the windshield wipers 14 are in the "OFF" state, then the sequence returns to Step 100 and resets the time $t_1$ of timer 28 to "0" before again sensing the state of the windshield wipers 14 at Step 102.

If the windshield wipers 14 are in the "ON" state, then control module 22 increments time $t_1$ at Step 104 and determines whether time $t_1$ is less than 10 seconds at Step 106. If time $t_1$ is less than 10 seconds, then the state of the windshield wipers 14 is again determined at Step 102. If the windshield wipers remain in the "ON" state, then the control module 22 again increments time $t_1$ at Step 104 and determines whether time $t_1$ is less than 10 seconds at Step 106. If time $t_1$ is less than 10 seconds, then these steps are repeated until time $t_1$ is greater than or equal to 10 seconds, or until the state of the windshield wipers 14 is determined to be in an "OFF" state at Step 102. If the state of the windshield wipers 14 changes to the "OFF" state prior to passage of ten seconds after transition from the "OFF" state to the "ON" state, then the sequence returns to Step 100 and resets the time $t_1$ to "0" before again sensing the state of the windshield wipers 14 at Step 102.

If the state of the windshield wipers 14 remains on for ten seconds after transition from the "OFF" state to the "ON" state, then the temperature ($T_A$) is sensed at Step 108. If temperature $T_A$ is determined to be greater than or equal to two degrees Celsius at Step 110, then the sequence returns to Step 100 and resets the time $t_1$ of timer 28 to "0" before again sensing the state of the windshield wipers 14 at Step 102. In other words, the heat source 18 is not turned to an "ON" state because at these temperatures the windshield wipers 14 should not freeze to the windshield 12.

If temperature $T_A$ is determined to be less than two degrees Celsius at Step 110, then the control module 22 turns the heat source 18 to an "ON" state at Step 112. In the sequence of the described embodiment, the heat source 18 remains in the "ON" state until the state of the windshield wipers 14 changes from the "ON" state to the "OFF" state. This change of state of the windshield wipers 14 is determined at Step 114. If the windshield wipers 14 remain in the "ON" state, then the sequence simply loops back to Step 114, in a monitoring posture, until the state of the windshield wipers 14 changes from the "ON" state to the "OFF" state at which point the state of the heat source 18 is changed from "ON" to "OFF" at Step 116. Once the heat source is switched to an "OFF" state, the sequence returns to Step 100 and resets the time $t_1$ to "0" before again sensing the state of the windshield wipers 14 at Step 102.

With reference back to FIG. 2, the control module 22 may signal the relay 38 to remove power supplied by the battery 40 of the vehicle 10 from the heat source 18 whether or not the state of the windshield wipers 14 has changed from the "ON" state to the "OFF" state in one alternate embodiment. Removal of power would occur in this instance if the output ($T_A$) of the temperature sensor 30 is no longer near or below zero degrees Celsius. In other words, if the ambient temperature of the vehicle 10 rises to a temperature above two degrees Celsius, for example, then the heat source 18 may be turned to an "OFF" state by the control module 22 regardless of the state of the windshield wipers 14. Essentially, the noted rise in temperature would remove the need for warming the windshield wiper park zone 16. In another embodiment, the heat source 18 may remain in the "ON" state for a predetermined period of time (e.g., 30 seconds) after the sensed temperature ($T_A$) is no longer near or below zero degrees Celsius to avoid hysteresis type issues, i.e., a turning off and on of the heat source when the sensed temperature quickly fluctuates above and below two degrees Celsius.

In another alternate embodiment, the heat source 18 may remain in the "ON" state for a predetermined period of time (e.g., 2 minutes) after the state of the windshield wipers 14 changes from the "OFF" state to the "ON" state. In this embodiment, the timer 28 in the control module 22 is utilized to determine when the predetermined period of time has elapsed. Once the predetermined period of time has elapsed, the control module 22 signals the relay 38 to remove power supplied by the battery 30 of the vehicle 10 from the heat source 18. In other words, the heat source 18 is turned to an "OFF" state by the control module 22. Of course, if the state of the windshield wipers 14 changes from the "ON" state to the "OFF" state prior to an end of the predetermined period of time, then the control module 22 would still signal the relay 38 to remove power from the heat source 18. In this instance, the timer would simply be reset.

Also, within the predetermined period of time, the control module 22 may signal the relay 38 to remove power from the heat source 18 if the output ($T_A$) of the temperature sensor 30 is no longer near or below zero degrees Celsius. Again, if the ambient temperature of the vehicle 10 rises to a temperature above two degrees Celsius, for example, then the heat source 18 is turned to an "OFF" state by the control module 22 regardless of whether the predetermined period of time has elapsed or the state of the windshield wipers 14 has changed to the "OFF" state.

In even more alternate embodiments, the control module 22 could initiate a pre-warming sequence prior to or in combination with the warming sequence initiated by turning the windshield wipers 14 to the "ON" state. For example, the pre-warming sequence could be initiated when the ignition switch 34 changes from the "OFF" state to the "ON" state when the vehicle 10 is started. As before, the control module 22 determines whether the sensed temperature ($T_A$) is near or below zero degrees Celsius. If the output ($T_A$) of the temperature sensor 30 is above two degrees Celsius, then no action is taken by the control module 22.

If the output ($T_A$) of the temperature sensor 30 is near or below zero degrees Celsius, then the control module 22 signals the relay 38 to switch power to the heat source 18 for warming the windshield wiper park zone 16. In other words, the heat source 18 is turned to an "ON" state by the control module 22. In one such alternate embodiment, the heat source 18 remains in the "ON" state for a predetermined period of time (e.g., 10 minutes). Again, the timer 28 in the control module 22 is utilized to determine when the predetermined period of time has elapsed. Once the predetermined period of time has elapsed, the control module 22 signals the relay 28 to remove power from the heat source 18. In other words, the heat source 18 is turned to an "OFF" state by the control module 22.

As before, the control module 22 may signal the relay 28 to remove power from the heat source 18 within the predetermined period of time if the output ($T_A$) of the temperature sensor 30 is no longer near or below zero degrees Celsius. In other words, if the ambient temperature of the vehicle rises to a temperature above two degrees Celsius, for example, then the heat source 18 is turned to an "OFF" state by the control module 22 regardless of whether the predetermined period of time had elapsed.

As noted above, the pre-warming sequence could be utilized in combination with the warming sequence initiated by turning the windshield wipers 14 to the "ON" state. In this embodiment, turning the windshield wipers 14 to the "ON" state would override the pre-warming sequence. In other words, the state of the windshield wipers would take over control of whether the state of the heat source 18 remains "ON" rather than the elapse of the predetermined period following the change in state of the ignition switch to the "ON" state. This embodiment assumes that the ignition switch would necessarily be turned to the "ON" state prior to the windshield wipers 14 being turned to the "ON" state.

In this embodiment, the heat source 18 would then remain in the "ON" state until the state of the windshield wipers 14 changes from the "ON" state to the "OFF" state as described above. Once the windshield wiper state changes to the "OFF" state, the control module 22 signals the relay 38 to remove power from the heat source 18. As described above, the control module 22 may also signal the relay 38 to remove power from the heat source 18 in this embodiment whether or not the state of the windshield wipers 14 has changed from the "ON" state to the "OFF" state. Removal of power would occur in this instance if the output ($T_A$) of the temperature sensor 30 is no longer near or below zero degrees Celsius, or after a predetermined period of time had elapsed.

In still other alternate embodiments, the control module 22 could initiate a second warming sequence in combination with the pre-warming sequence initiated by turning the ignition switch 34 to the "ON" state and the warming sequence initiated by turning the windshield wipers 14 to the "ON" state. For example, the second warming sequence could be initiated when the defrost switch 36 changes from the "OFF" state to the "ON." As before, the control module 22 determines whether the sensed temperature ($T_A$) is near or below zero degrees Celsius. If the output ($T_A$) of the temperature sensor 30 is above two degrees Celsius, then no action is taken by the control module 22. If the sensed temperature ($T_A$) is near or below zero degrees Celsius, then the control module 22 signals the relay 38 to switch power to the heat source 18.

In this alternate embodiment, the heat source 18 remains in the "ON" state until the state of the defrost switch 36 changes from the "ON" state to the "OFF" state. With the described change of state, the control module 22 signals the relay 38 to remove power from the heat source 18. Alternatively, the heat source 18 may remain in the "ON" state for a predetermined period of time (e.g., 30 seconds) following the change in state of the defrost switch 36. The timer 28 in the control module 22 is utilized to determine when the predetermined period of time has elapsed. Once the predetermined period of time has elapsed, the control module 22 signals the relay 38 to remove power from the heat source 18.

In even more alternate embodiments, the control module 10 may signal the relay 38 to remove power from the heat source 18 if the temperature sensor output ($T_A$) is no longer near or below zero degrees Celsius. In other words, if the ambient temperature of the vehicle rises to a temperature above two degrees Celsius, for example, then the heat source 18 is turned to an "OFF" state by the control module 22 regardless of whether the defrost switch 36 remains in the "ON" state and/or whether the predetermined period of time had elapsed.

As noted above, the second warming sequence initiated by turning the defrost switch 36 to the "ON" state may be utilized in combination with the pre-warming sequence initiated by turning the ignition switch 34 to the "ON" state and the first warming sequence initiated by turning the windshield wiper switch 32 to the "ON" state. In this embodiment, turning the windshield wipers 14 to the "ON" state would override the pre-warming sequence and the second warming sequence. In other words, the state of the windshield wipers 14 would determine whether power is switched to the heat source 18 rather than the change in state of the ignition switch to the "ON" state, whether the predetermined period of time following that change in state had elapsed, or the change in state of the defrost switch to the "ON" state, or whether the predetermined period of time following that change in state had elapsed.

In summary, numerous benefits result from the method of preventing a windshield wiper from freezing to a windshield of a vehicle as illustrated in this document. The method is capable of warming a windshield wiper park zone when an ambient temperature of a vehicle is near or below freezing. In fact, a heat source can be applied to the windshield wiper park zone following operation of the windshield wipers for a predetermined period of time when an ambient temperature is sensed to be a certain temperature. Even more, the heat source can be applied/removed when certain other events occur, such as, turning on the vehicle, turning on a defroster, or the like. The heat source can remain on as long as the event remains occurring (e.g., as long as the defroster remains on) or for a predetermined period of time. Also, each of these events can be utilized in varying combinations to control the heat source and prevent the windshield wipers from freezing to the windshield of the vehicle.

The foregoing has been presented for purposes of illustration and description. It is not intended to be exhaustive or to limit the embodiments to the precise form disclosed. Obvious modifications and variations are possible in light of the above teachings. For example, warming of the windshield wiper park zone could occur when climate control modes other than the defrost mode are engaged. For example, warming could occur when a combination defrost/floor mode is selected by the vehicle operator. This provides added security against the possibility of the windshield wipers freezing to the windshield. All such modifications and variations are within the scope of the appended claims when interpreted in accordance with the breadth to which they are fairly, legally and equitably entitled.

What is claimed:

1. A method of preventing a windshield wiper from freezing to a windshield of a vehicle, comprising the steps of:
   monitoring a state of said windshield wiper;
   initiating a timer when the state of said windshield wiper changes from an off state to an on state;
   sensing an ambient temperature of said vehicle a first period of time after initiation of said timer if said windshield wiper remains in the on state; and
   warming a portion of said windshield where said windshield wiper resides in the off state if the sensed ambient temperature of said vehicle is near or below zero degrees Celsius.

2. The method of preventing a windshield wiper from freezing to a windshield of a vehicle of claim 1, wherein the warming step is performed only if said windshield wiper remains in the on state throughout the first period of time.

3. The method of preventing a windshield wiper from freezing to a windshield of a vehicle of claim 2, wherein the first period of time is equal to or greater than ten seconds.

4. The method of preventing a windshield wiper from freezing to a windshield of a vehicle of claim 2, wherein the warming step is performed for a second period of time.

5. The method of preventing a windshield wiper from freezing to a windshield of a vehicle of claim 2, wherein the warming step is performed until the state of said windshield wiper changes from the on state to the off state.

6. The method of preventing a windshield wiper from freezing to a windshield of a vehicle of claim 2, wherein the step of sensing an ambient temperature of said vehicle a first period of time after initiation of said timer is continuous, and the warming step is performed until the state of said windshield wiper changes from the on state to the off state or the sensed ambient temperature of said vehicle is no longer near or below zero.

7. The method of preventing a windshield wiper from freezing to a windshield of a vehicle of claim 2, further comprising the steps of monitoring a state of an engine of said vehicle;
   sensing an ambient temperature of said vehicle when the state of said engine changes from an off state to an on state; and
   warming a portion of said windshield where said windshield wiper resides in the off state for a third period of time if the sensed ambient temperature of said vehicle related to the state of said engine is near or below zero degrees Celsius.

8. The method of preventing a windshield wiper from freezing to a windshield of a vehicle of claim 7, wherein the warming step relating to the state of said windshield wiper is performed only if said windshield wiper remains in the on state throughout the first period of time.

9. The method of preventing a windshield wiper from freezing to a windshield of a vehicle of claim 7, wherein the warming step relating to the state of said windshield wiper is performed until the state of said windshield wiper changes from the on state to the off state.

10. A method of preventing a windshield wiper from freezing to a windshield of a vehicle, comprising the steps of:
    continuously sensing an ambient temperature of said vehicle;
    initiating a timer when a state of said windshield wiper changes from an off state to an on state; and
    warming a portion of said windshield where said windshield wiper resides in the off state if the sensed ambient temperature of said vehicle is near or below zero degrees Celsius a predetermined period of time after initiation of said timer.

11. The method of preventing a windshield wiper from freezing to a windshield of a vehicle of claim 10, wherein the warming step is performed only if said windshield wiper remains in the on state throughout the predetermined period of time.

12. The method of preventing a windshield wiper from freezing to a windshield of a vehicle of claim 11, wherein the predetermined period of time is equal to or greater than ten seconds.

13. The method of preventing a windshield wiper from freezing to a windshield of a vehicle of claim 11, wherein the warming step is performed for a second predetermined period of time.

14. The method of preventing a windshield wiper from freezing to a windshield of a vehicle of claim 11, wherein the warming step is performed until the state of said windshield wiper changes from the on state to the off state or the sensed ambient temperature of said vehicle is no longer near or below zero.

15. The method of preventing a windshield wiper from freezing to a windshield of a vehicle of claim 11, further comprising the steps of monitoring a state of an engine of said vehicle; and initiating the warming step when the state of said engine changes from an off state to an on state if the sensed ambient temperature of said vehicle is near or below zero degrees Celsius.

16. The method of preventing a windshield wiper from freezing to a windshield of a vehicle of claim 11, further comprising the steps of monitoring a state of a defrost switch of said vehicle; and initiating the warming step when the state of said defrost switch changes from an off state to an on state if the sensed ambient temperature of said vehicle is near or below zero degrees Celsius.

17. A circuit for preventing a windshield wiper from freezing to a windshield of a vehicle comprising:

a temperature sensor for sensing an ambient temperature of a vehicle;

a windshield wiper switch for controlling a state of the windshield wiper;

a climate control module for receiving an output of said temperature sensor indicative of the ambient temperature of the vehicle, monitoring the state of the windshield wiper, and initiating a timer when the state of the windshield wiper changes from an off state to an on state;

a heat source thermally coupled to the windshield for warming a portion of the windshield where the windshield wiper resides in an off state; and a switch, responsive to said climate control module, for switching power to said heat source if the sensed ambient temperature of the vehicle is near or below zero degrees Celsius and said windshield wiper is in the on state for a predetermined period of time.

18. The circuit for preventing a windshield wiper from freezing to a windshield of a vehicle of claim 17, wherein the predetermined period of time is equal to or greater than ten seconds.

19. The circuit for preventing a windshield wiper from freezing to a windshield of a vehicle of claim 17, wherein said switch, responsive to said climate control module, removes power to said heat source if said the state of said windshield wiper changes from the on state to the off state or the sensed ambient temperature of the vehicle is no longer near or below zero.

20. A vehicle incorporating the circuit for preventing a windshield wiper from freezing to a windshield of claim 17.

* * * * *